United States Patent
Maekawa

(10) Patent No.: US 7,186,764 B2
(45) Date of Patent: Mar. 6, 2007

(54) REINFORCED POLYTRIMETHYLENE TEREPHTHALATE RESIN COMPOSITION

(75) Inventor: Tomofumi Maekawa, Kawasaki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/475,798

(22) PCT Filed: Apr. 30, 2002

(86) PCT No.: PCT/JP02/04324

§ 371 (c)(1),
(2), (4) Date: Oct. 24, 2003

(87) PCT Pub. No.: WO02/090435

PCT Pub. Date: Nov. 14, 2002

(65) Prior Publication Data

US 2004/0147635 A1 Jul. 29, 2004

(30) Foreign Application Priority Data

May 2, 2001 (JP) ............................. 2001-135289
Jul. 27, 2001 (JP) ............................. 2001-227618

(51) Int. Cl.
*C08K 9/04* (2006.01)
*C08K 3/40* (2006.01)

(52) U.S. Cl. ...................... 523/209; 523/200; 523/205; 523/212; 523/214; 524/492; 524/493; 524/601; 524/604

(58) Field of Classification Search ................ 523/200, 523/209; 524/492, 493
See application file for complete search history.

(56) References Cited

U.S. PATENT DOCUMENTS 3,437,632 A    4/1969   Hechelhammer et al.
4,102,853 A *  7/1978   Kawamura et al. ......... 524/425
4,692,480 A *  9/1987   Takahashi et al. .......... 523/218
4,912,167 A *  3/1990   Deyrup et al. .............. 525/166
4,927,869 A    5/1990   Dana et al.
5,021,289 A    6/1991   Light et al.
5,340,909 A    8/1994   Doerr et al.
6,187,848 B1 * 2/2001   Pixton et al. ................ 524/126

FOREIGN PATENT DOCUMENTS

| EP | 0 100 934 A1 | 2/1984 |
|---|---|---|
| GB | 2 114 141 A | 8/1983 |
| JP | 47-34444 A | 11/1972 |
| JP | 48 084138 A | 11/1973 |
| JP | 51-140992 | 12/1976 |
| JP | 53-106749 A | 9/1978 |
| JP | 53106750 A * | 9/1978 |
| JP | 5-262862 | 10/1993 |
| JP | 07 216205 A | 8/1995 |
| JP | 8-311177 | 11/1996 |
| JP | 2000-297216 A | 10/2000 |
| JP | 2001-172055 A | 6/2001 |

OTHER PUBLICATIONS

Full English-language translation of JP 53-106750, Sep. 18, 1978.*

* cited by examiner

Primary Examiner—Vasu Jagannathan
Assistant Examiner—Vickey Ronesi
(74) Attorney, Agent, or Firm—Birch, Stewart, Kolasch & Birch, LLP

(57) ABSTRACT

A reinforced polytrimethylene terephthalate resin composition comprising a polytrimethylene terephthalate and an inorganic filler, wherein an amount of the inorganic filler falls within the range from 5 to 70% by weight based on a total weight of the resin composition, an amount of a grafting polytrimethylene terephthalate layer provided on a surface of the inorganic filler falls within the range from 0.1 to 2 parts by weight based on 100 parts by weight of the inorganic filler, and a melt viscosity measured at a resin temperature of 260° C. and a shear rate of 1 rad/sec of a resin component in the resin composition is not more than 600 Pa·s.

10 Claims, No Drawings

REINFORCED POLYTRIMETHYLENE TEREPHTHALATE RESIN COMPOSITION

This application is the national phase under 35 U.S.C. § 371 of PCT International Application No. PCT/JP02/04324 which has an International filing date of Apr. 30, 2002, which designated the United States of America.

TECHNICAL FIELD

The present invention relates to a polytrimethylene terephthalate resin composition reinforced with an inorganic filler. More specifically, the present invention relates to a reinforced polytrimethylene terephthalate resin composition, whose molded product is remarkably improved in mechanical properties, particularly fatigue properties without detriment to molding appearance.

BACKGROUND ART

A reinforced polyester resin composition is known as an engineering resin superior in various properties such as mechanical strength, stiffness, weather resistance, heat resistance, dimensional stability and chemical resistance and also is excellent in molding appearance, and is of extensively wide application for car use and industrial use.

In recent years, there has been a remarkable trend to replace car structural parts made of metal with those made of a reinforced thermoplastic resin, due to its reduced weight for the purpose of improving fuel expenses, cost saving and modular or integrated designing of parts. Such a resin material has been strongly desired to maintain its superior properties for a longer period of time even under more severe conditions. One of important performance characteristics particularly required for car exterior parts and materials for parts used near the engine is fatigue properties, and from the viewpoint of the designing parts, it becomes necessary that the resin material has improved fatigue properties.

As mentioned above, the resin material used for various structural members such as car parts has been further desired to be improved in long-term reliability of material properties.

Among reinforced polyester resins, a reinforced polytrimethylene terephthalate resin composition is particularly superior in mechanical properties, weather resistance, heat-aging resistance and molding appearance and therefore is expected to be developed for wide application.

However, with respect to dynamic mechanical properties such as fatigue properties, the reinforced polytrimethylene terephthalate resin has been examined to a lesser extent as compared with metal, and was deemed to be poor in long-term reliability of material properties under severe conditions such as when subjected to periodic stress. Furthermore, there has been almost no estimation of fatigue life of the reinforced polytrimethylene terephthalate material, and moreover there has been almost no quantitative analysis of the relationship between the fatigue properties and the polymer structure.

In the meantime, as a method for improving the fatigue properties, it has so far been generally accepted that glass fiber can be incorporated in a resin material in a high concentration to improve initial mechanical properties, thereby lengthening the fatigue life. However, the method is not always satisfactory, because problems result such as the weight of parts increasing and molding appearance becomes poor.

For example, JP-A-47-34444 discloses that a glass fiber-reinforced polytrimethylene terephthalate resin composition is blended with a third component, namely a polyfunctional compound, thereby improving mechanical properties and heat resistance. However, effects thereof are not yet sufficient. Moreover, due to the blending of the polyfunctional compound there is a problem such that flow properties at a low shear rate peculiar to the glass fiber-reinforced polytrimethylene terephthalte resin composition decrease and as a result poor appearance is observed at a flow terminal portion of a molded product.

Further, JP-A-53-106749 discloses that a glass fiber-reinforced polytrimethylene terephthalate resin composition is blended with glass fiber covered with a vinyl polymer, thereby improving mechanical strength and warping deformation. However, sufficient fatigue properties are not yet obtained.

Still further, JP-A-2001-172055 discloses a glass fiber-reinforced polybutylene terephthalate resin composition obtained by blending polybutylene terephthalate with a surface-treated glass fiber, which composition is described to be superior in mechanical strength, tracking resistance and hydrolysis resistance. However, the mechanical characteristics and fatigue characteristic exhibited are still too insufficient to be applied for structural parts.

An object of the present invention is to provide a reinforced polytrimethylene terephthalate resin composition, which has remarkable improvement in mechanical properties, particularly the fatigue characteristic without detriment to superior characteristics peculiar to the reinforced polytrimethylene terephthalate itself.

DISCLOSURE OF INVENTION

The present inventors have found a fact that mechanical properties, particularly fatigue properties of a resin composition comprising a polytrimethylene terephthalate and an inorganic filler can be remarkably improved without detriment to molding appearance, provided that the inorganic filler is used in a specific amount, a grafting polytrimethylene terephtalate layer is provided on a surface of the inorganic filler in a specific proportion, and a melt viscosity of a resin component present in the resin composition is controlled within a specific range. Thereby, the present invention has been accomplished.

That is, the present invention provides as follows.

(1) A reinforced polytrimethylene terephthalate resin composition comprising a polytrimethylene terephthalate and an inorganic filler, wherein an amount of the inorganic filler falls within the range from 5 to 70% by weight based on a total weight of the resin composition, an amount of a grafting polytrimethylene terephthalate layer provided on a surface of the inorganic filler falls within the range from 0.1 to 2 parts by weight based on 100 parts by weight of the inorganic filler, wherein an intrinsic viscosity of the polytrimethylene terephthalate present in the resin composition is 0.7 dl/g or more, and wherein a melt viscosity measured at a resin temperature of 260° C. and a shear rate of 1 rad/sec of a resin component present in the resin composition is not more than 600 Pa·s.

(2) The reinforced polytrimethylene terephthalate resin composition according to the above item (1), wherein the surface of the inorganic filler is grafted with a polytrimethylene terephthalate layer having a concentration in the range from 0.12 to 2 parts by weight based on 100 parts by weight of the inorganic filler.

(3) The reinforced polytrimethylene terephthalate resin composition according to the above item (1), wherein a surface of the inorganic filler is grafted with a polytrimethylene terephthalate layer having a concentration in the range from 0.18 to 2 parts by weight based on 100 parts by weight of the inorganic filler.

(4) The reinforced polytrimethylene terephthalate resin composition according to item (1), (2) or (3), wherein the inorganic filler comprises glass fiber and/or wollastonite.

(5) The reinforced polytrimethylene terephthalate resin composition according to item (4), wherein the inorganic filler is glass fiber.

(6) The reinforced polytrimethylene terephthalate resin composition according to item (1), (2) or (3), wherein the inorganic filler is a combination of glass fiber and an inorganic filler other than glass fiber.

(7) The reinforced polytrimethylene terephthalate resin composition according to item (6), wherein the inorganic filler other than glass fiber is wollastonite.

(8) A molded product formed from the reinforced polytrimethylene terephthalate resin composition according to any one of the above items (1) to (7).

(9) The molded product according to the above item (8), which is an injection-molded product.

(10) A car part formed from the reinforced polytrimethylene terephthalate resin composition according to any one of items (1) to (7).

BEST MODE FOR CARRYING OUT THE INVENTION

The reinforced polytrimethylene terephthalate resin composition in accordance with the present invention is explained in detail as follows.

The reinforced polytrimethylene terephthalate resin composition in accordance with the present invention comprises a polytrimethylene terephthalate and an inorganic filler.

The polytrimethylene terephthalate of the present invention (hereinafter referred to as "PTT", as the case may be) means a polyester polymer obtained by using terephthalic acid as an acid component and a trimethylene glycol as a glycol component.

Here, the trimethylene glycol can be selected from 1,3-propanediol, 1,2-propanediol, 1,1-propanediol, 2,2-propanediol and a mixture thereof. From the viewpoint of crystallization rate, 1,3-propanediol is particularly preferred.

Incidentally, in a manner such that the object of the present invention is not impaired, PTT of the present invention may include those obtained through copolymerization of an acid component other than terephthalic acid and another glycol component. Examples of such an acid component are aromatic dicarboxylic acids such as phthalic acid, isophthalic acid, 2,6-naphthalenedicarboxylic acid, diphenyldicarboxylic acid, diphenyl ether dicarboxylic acid, diphenoxyethanedicarboxylic acid, diphenylmethanedicarboxylic acid, diphenyl ketone dicarboxylic acid and diphenyl sulfone dicarboxylic acid; aliphatic dicarboxylic acids such as succinic acid, adipic acid and sebacic acid; alicyclic dicarboxylic acids such as cyclohexanedicarboxylic acid; and oxydicarboxylic acids such as ε-oxycaproic acid, hydroxybenzoic acid and hydroxyethoxybenzoic acid. Examples of such a glycol component are ethylene glycol, tetramethylene glycol, pentamethylene glycol, hexamethylene glycol, octamethylene glycol, neopentyl glycol, cyclohexane dimethanol, xylylene glycol, diethylene glycol, polyoxyalkylene glycol and hydroquinone.

In the case where the copolymerization is carried out, respective amounts of the components used for the copolymerization are not particularly limited as far as the object of the present invention is not impaired. Usually, it is preferred that the amount is not more than 20% by mole of a total acid component or not more than 20% by mole of a total glycol component.

In addition to the above-mentioned components for forming the polyester, a branched component may participate in the copolymerization. Examples of the branched component are tri-functional or tetra-functional acids capable of forming an ester such as tricarballylic acid, trimesic acid and trimellitic acid, and tri-functional or tetra-functional alcohols capable of forming an ester such as glycerol, trimethylolpropane and pentaerythritol. In this case, an amount of the branched component is not more than 1.0% by mole per mole of a total acid component or a total glycol component. Preferred is not more than 0.5% by mole, and more preferred is not more than 0.3% by mole. Further, PTT may be utilized in a manner of the combination of two or more kinds of these copolymers.

It is preferred that an amount of the polytrimethylene terephthalate in the reinforced polytrimethylene terephthalate resin composition is from 30 to 95% by weight based on a total weight of the resin composition.

How to obtain PTT used in the present invention is not particularly limited, and it may be obtained according to any process described in, for example, JP-A-51-140992, JP-A-5-262862 and JP-A-8-311177.

For example, there is mentioned a process as follows. Terephthalic acid or its derivative capable of forming an ester (for example, its lower alkyl esters such as dimethyl terephthalate and monomethyl terephthalate) and the trimethylene glycol or its derivative capable of forming an ester are subjected to heat reaction at a suitable temperature for a suitable period of time in the presence of a catalyst. Thereafter, the obtained terephthalic acid-glycol ester is further subjected to polycondensation at a suitable temperature for a suitable period of time in the presence of a catalyst to the extent of a desired polymerization degree.

A polymerization manner is not also particularly limited. Examples of the manner applicable are melt polymerization, interfacial polymerization, solution polymerization, bulk polymerization, solid phase polymerization and a combination thereof.

If desired, various additives such as heat stabilizers, antifoaming agents, orthochromatic agents, flame retarders, antioxidants, ultraviolet absorbers, infrared absorbers, crystal nucleating agents, fluorescent brightening agents and delustering agents may be copolymerized with or incorporated in PTT used in the present invention.

Intrinsic viscosity of PTT used for the resin composition in accordance with the present invention is not particularly limited. From the viewpoint of mechanical properties, particularly fatigue properties, the intrinsic viscosity is preferably not less than 0.50. More preferred is not less than 0.60, and the most preferred is not less than 0.70.

Next, the inorganic filler used in the present invention is explained as follows.

As the inorganic filler in the present invention, at least one inorganic filler selected from the group consisting of a fibrous inorganic filler, a powdery granular inorganic filler and a plate-like inorganic filler is used depending upon the purposes.

Examples of the fibrous inorganic filler are glass fiber, carbon fiber, silica fiber, silica alumina fiber, zirconia fiber, boron nitride fiber, silicon nitride fiber, boron fiber, potassium titanate whisker, wollastonite and a fibrous material of a metal such as stainless steel, aluminum, titanium, copper and brass. Incidentally, a high melting organic fibrous substance such as a polyamide, a fluororesin and an acrylic resin may be used at the same time with the inorganic filler.

Here, an average fiber length of glass fiber in the reinforced polytrimethylene terephthalate resin composition (hereinafter referred to as "L", as the case may be), an average fiber diameter thereof (hereinafter referred to as "D", as the case may be) and an aspect ratio thereof (hereinafter referred to as "L/D") are not particularly limited. From the viewpoint of the mechanical properties and fatigue properties, the average fiber length is preferably not less than 50 μm. More preferred is not less than 100 μm, and the most preferred is not less than 150 μm. The average fiber diameter is preferably not less than 5 μm. The aspect ratio is preferably not less than 10.

Further, with respect to carbon fiber, those having an average fiber length (L) of from 100 to 750 μm, an average fiber diameter (D) of from 3 to 30 μm, and an aspect ratio (L/D) of from 10 to 100 are preferably used. Still further, with respect to wollastonite, those having an average fiber length of from 10 to 500 μm, an average fiber diameter of from 3 to 30 μm, and an aspect ratio (L/D) of from 3 to 100 are preferably used.

Examples of the powdery granular inorganic filler are carbon black, silica, quartz powder, glass beads, glass powder, silicates such as calcium silicate, aluminum silicate, kaolin, clay and diatomaceous earth, and various metal powders, for example, metal oxides such as iron oxide, titanium oxide, zinc oxide and alumina, metal carbonates such as calcium carbonate and magnesium carbonate, metal sulfates such as calcium sulfate and barium sulfate, and others including silicon carbide, silicon nitride and boron nitride. With respect to talc, mica, kaolin, calcium carbonate and potassium titanate, those having an average particle diameter of from 0.1 to 100 μm are the most preferably used.

Examples of the plate like inorganic filler are talc, mica, glass flake and various metallic foils.

Among the inorganic fillers, glass fiber is the most preferably used from the viewpoint of mechanical properties and fatigue properties of the molded product. Glass fiber may be those conventionally used in combination with a polyester resin, and a kind thereof and the like are not particularly limited.

The inorganic filler may be used singly or in combination of two or more thereof. In the present invention, a combination use of glass fiber and an inorganic fiber other than glass fiber, particularly a combination use of glass fiber and the granular and/or plate like inorganic filler, is preferred because mechanical strength, dimensional accuracy and electrical properties are provided at the same time.

An amount of the inorganic filler in the reinforced polytrimethylene terephthalate resin composition is from 5 to 70% by weight based on a total weight of the resin composition. When it is less than 5% by weight, there is no improving effect of the mechanical strength. When it exceeds 70% by weight, molding appearance is impaired and increase of specific gravity is caused.

In the present invention, it is necessary that a grafting polytrimethylene terephthalate layer is provided on a surface of the inorganic filler present in the polytrimethylene terephthalate resin composition in a specific proportion.

Herein, the grafting polytrimethylene terephthalate layer provided on a surface of the inorganic filler is as follows. When the reinforced polytrimethylene terephthalate resin composition is dipped in a solvent capable of generally dissolving a polyester resin (for example, o-chlorophenol) to dissolve the polytrimethylene terephthalate and deposit the inorganic filler, an organic layer comprising polytrimethylene terephthalate as a main constituent remains on a surface of the inorganic filler without dissolution in said solvent. The organic layer is defined to be the grafting polytrimethylene terephthalate layer as far as the presence of the polytrimethylene terephthalate is made sure according to infrared absorption spectrum or pyrolysis gas chromatography analysis.

More specific explanation about the method for obtaining of the graft polytrimethylene terephthalate layer is given as follows.

First of all, in order to separate polytrimethylene terephthalate failing to graft with the inorganic filler in the reinforced polytrimethylene terephthalate resin composition, the resin composition is mixed with a HFIP (hexafluoroisopropanol) solvent. Successively, the HFIP solution portion, in which polytrimethylene terephthalate is dissolved, is removed, and the remaining inorganic filler portion is washed several times with the HFIP solvent until no polytrimethylene terephthalate is dissolved in the solvent. After making sure that no polytrimethylene terephthalate is present in any washing by means of IR, NMR or the like, the resultant is washed several times with ethanol to remove the HFIP solvent, and drying is carried out to remove ethanol. According to such a procedure, the inorganic filler grafted with the organic layer (hereinafter referred to as "grafted inorganic filler, as the case may be) is taken out from the resin composition. The organic layer grafting on the inorganic filler is called the grafting polytrimethylene terephthalate layer. Incidentally, according to an analysis of the organic layer using infrared absorption spectrum or pyrolysis gas chromatography/mass spectrum (hereinafter referred to as "PyGC/MS"), the main constituent of the organic layer can be confirmed to be polytrimethylene terephthalate.

Further, using the grafted inorganic filler obtained above and according to JIS R3420 (Ignition Loss), an amount of the grafting polytrimethylene terephthalate layer provided on a surface of the inorganic filler (hereinafter referred to as "grafting amount", as the case may be) can be determined from the following equation in terms of a grafting amount (part by weight) per 100 parts by weight of the inorganic filler.

Grafting amount per 100 parts by weight of inorganic filler (parts by weight)=$[(W0 - W1)/W1] \times 100$ W0: Weight of the grafted inorganic filler before baking W1: Weight of the grafted inorganic filler after baking An amount of the grafting polytrimethylene terephthalate layer provided on a surface of the inorganic filler is from 0.1 to 2 parts by weight based on 100 parts by weight of the inorganic filler. Preferred is from 0.12 to 1.5 parts by weight, more preferred is from 0.15 to 1.0 part by weight, and the most preferred is from 0.20 to 0.7 part by weight. When the amount is less than 0.1 part by weight, covering of the inorganic filler surface is not sufficient, so that it cannot be said that mechanical strength and fatigue resistance of the resulting composition are sufficient. On the other hand, when it exceeds 2 parts by weight, melt flowability deteriorates, so that a high pressure is required at the time of injection molding.

In the present invention, in order to provide such a specific amount of the grafting polytrimethylene terephthalate layer on the surface of the inorganic filler present in the polytrimethylene terephthalate resin composition, it is preferred that the above-mentioned inorganic filler is subjected to surface treatment.

How to carry out the surface treatment of the inorganic filler is not particularly limited. It may be carried out using a coupling agent and a film-forming agent. In the present invention, it is preferred that a coupling agent and a film-forming agent are used at the same time.

The coupling agent includes, for example, a silane coupling agent and a titanium coupling agent.

Examples of the silane coupling agent are triethoxysilane, vinyltris(β-methoxyethoxy)silane, γ-methacryloxypropyltrimethoxysilane, γ-glycidoxypropyltrimethoxysilane, β-(1,1-epoxycyclohexyl)ethyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, γ-chloropropyltrimethoxysilane, γ-aminopropyltrimethoxysilane, γ-aminopropyl-tris(2-methoxy-ethoxy)silane, N-methyl-γ-aminopropyltrimethoxysilane, N-vinylbenzyl-γ-aminopropyltriethoxysilane, triaminopropyltrimethoxysilane, 3-ureidopropyltrimethoxysilane, 3-4,5-dihydroimidazolpropyltriethoxysilane, hexamethyldisilazane, N,O-(bistrimethylsilyl)amide and N,N-bis(trimethylsilyl)urea.

Of these, aminosilanes such as γ-aminopropyltrimethoxysilane and N-β-(aminoethyl)-γ-aminopropyltrimethoxysilane, and epoxysilanes such as γ-glycidoxypropyltrimethoxysilane and β-(1,1-epoxycyclohexyl)ethyltrimethoxysilane are preferably used from an economical point of view and from the viewpoint of easy handling.

Examples of the titanium coupling agent are isopropyltriisostearoyl titanate, isopropyltridodecylbenzenesulfonyl titanate, isopropyl-tris(dioctylpyrophosphate) titanate, tetraisopropyl-bis(dioctylphosphite) titanate, tetraoctyl-bis(ditridecylphosphite) titanate, tetra(1,1-diallyloxymethyl-1-butyl)-bis(ditridecyl)phosphite titanate, bis(dioctylpyrophosphate)oxyacetate titanate, bis(dioctylpyrophosphate)ethylene titanate, isopropyltrioctanoyl titanate, isopropyldimethacrylisostearoyl titanate, isopropylisostearoyldiacryl titanate, isopropyl-tri(dioctylphosphate)titanate, isopropyltricumylphenyl titanate, isopropyl-tri(N-amidoethyl, aminoethyl) titanate, dicumylphenyloxyacetate titanate and diisostearoylethylene titanate.

The film-forming agent includes, for example, a polymer such as urethane polymers, acrylic acid polymers, copolymers of maleic anhydride and an unsaturated monomer such as ethylene, styrene, α-methylstyrene, butadiene, isoprene, chloroprene, 2,3-dichlorobutadiene, 1,3-pentadiene and cyclooctadiene, epoxy polymers, polyester polymers and polyether polymers.

Of these, epoxy polymers, urethane polymers, acrylic acid polymers, butadiene-maleic anhydride copolymers, ethylene-maleic anhydride copolymers, styrene-maleic anhydride copolymers and their mixtures are particularly preferably used from an economical point of view and from the viewpoint of superior fatigue properties.

The surface treatment of the inorganic filler may be carried out in a conventional manner using these coupling agents and film-forming agents. As such a manner, there are mentioned, for example, a sizing treatment wherein a solution or suspension of the above-mentioned coupling agent and/or film-forming agent in an organic solvent is used as a so-called sizing agent and coated on the surface, a dry mixing method wherein coating of the coupling agent and/or film-forming agent is carried out using Henschell mixer, super mixer, ready mixer, twin-cylinder mixter or the like, a spray method wherein coating of the coupling agent and/or film-forming agent is carried out through spraying, an integral blend treatment and a dry concentration method. In addition, there is also mentioned a combination of these methods, for example, a method wherein the coating of the coupling agent and a part of the film-forming agent is carried out according to the sizing treatment, and then the remaining film-forming agent is sprayed. Of these, the sizing treatment, the dry mixing method, the spraying method and a combination thereof are preferred from an economical point of view.

The reinforced polytrimethylene terephthalate resin composition in accordance with the present inventioncan be obtained by, for example, melt-kneading the polytrimethylene terephthalate, the inorganic filler and the additives added when necessary with use of an extruder equipped with a screw appropriately designed. The amount of the grafting polytrimethylene terephthalate layer provided on the surface of the inorganic filler present in the composition can be controlled by selecting extrusion conditions (temperature, design of the screw and the like), a molecular weight or terminal group concentration of the polytrimethylene terephthalate, the treating manner of the surface of glass fiber, and the like. Incidentally, how to obtain the reinforced polytrimethylene terephthalate resin composition in accordance with the present invention is not particularly limited as far as the grafting polytrimethylene terephthalate layer is obtained in the amount within the range as defined in the present invention.

With respect to the reinforced polytrimethylene terephthalate resin composition in accordance with the present invention, intrinsic viscosity [η] of a polytrimethylene terephthalate portion, which is a remaining portion after eliminating the inorganic filler from the present resin composition, is not particularly limited. From the viewpoint of the mechanical properties, particularly fatigue properties, preferred is not less than 0.50, more preferred is not less than 0.60, and the most preferred is not less than 0.70.

The intrinsic viscosity [η] can be measured as follows. The resin composition is dissolved in o-chlorophenol so as to obtain a solute (PTT component) concentration of 1.00 g/dl. After precipitating insoluble matters (the inorganic filler and others), specific viscosity of the supernatant ηsp is measured at 35° C. using Ostwald viscometer, and the intrinsic viscosity can be calculated from the following equation.

$$[\eta]=0.713\times \eta sp/C+0.1086$$

$$C=1.00\ g/dl$$

Further with respect to the reinforced polytrimethylene terephthalate resin composition in accordance with the present invention, melt viscosity measured at a resin temperature of 260° C. and a shear rate of 1 rad/sec of the resin portion, which is a remaining portion after eliminating the inorganic filler from the present composition, is not more than 600 Pa·s in consideration of molding appearance. Preferred is not more than 500 Pa·s, and the most preferred is not more than 400 Pa·s. When the melt viscosity exceeds 600 Pa·s, appearance at an end portion of the molded product is impaired.

In the reinforced polytrimethylene terephthalate resin composition in accordance with the present invention, other components in addition to the above-mentioned polytrimethylene terephthalate and inorganic filler may be appropriately incorporated depending upon various uses and purposes.

A crystal nucleating agent may be additionally incorporated in the resin composition in accordance with the present invention, thereby obtaining a composition having a higher mechanical strength. The crystal nucleating agent may be any of inorganic substances and organic substances. Examples of the inorganic substances are elemental substances such as Zn powder, Al powder, graphite and carbon black, metal oxides such as ZnO, MgO, $Al_2O_3$, $TiO_2$, $MnO_2$, $SiO_2$ and $Fe_3O_4$, nitrides such as aluminum nitride, silicon nitride, titanium nitride and boron nitride, inorganic salts such as $Na_2CO_3$, $CaCO_3$, $MgCO_3$, $CaSO_4$, $CaSiO_3$, $BaSO_3$ and $Ca_3(PO_4)_2$, and clay-type substances such as talc, kaolin, clay and white bole. These may be used singly or in combination of two or more thereof. Examples of the organic substances are organic salts such as calcium oxalate, sodium oxalate, calcium benzoate, calcium phthalate, calcium tartrate, magnesium stearate and polyacrylic acid salts, high molecular weight substances such as polyester, polyethylene and polypropylene, and cross-linked high molecular weight substances. These may be used singly or in combination of two or more thereof. Of these, particularly preferred are boron nitride, clay-type substances such as talc, kaolin, clay and white bole and organic salts. These crystal nucleating agents may be used in an amount of from 0.001 to 5 parts by weight based on 100 parts by weight of PTT. From the viewpoint of mechanical properties, especially preferred is from 0.01 to 3 parts by weight based thereon.

A mold lubricant may be additionally incorporated in the resin composition in accordance with the present invention, thereby obtaining a reinforced resin composition further superior in molding and processing properties and molding appearance. The mold lubricant includes phosphoric acid esters, phosphorous acid esters, higher fatty acids, higher fatty acid metal salts, higher fatty acid esters, higher fatty acid amide compounds, polyalkylene glycols or their terminal modified substances, low molecular weight polyethylene or oxidized low molecular weight polyethylene, substituted benzylidene sorbitols, polysiloxanes and caprolactones. Of these, particularly preferred are (a) a higher fatty acid, (b) a higher fatty acid metal salt and (c) a higher fatty acid ester. These mold lubricants are explained in detail as follows.

(a) Higher Fatty Acid

As the higher fatty acid, a saturated higher fatty acid, a unsaturated higher fatty acid and a mixture thereof are preferably used.

(a-1) Saturated Higher Fatty Acid

Examples of the saturated higher fatty acid are capric acid, uradecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, lacceric acid and a mixture thereof.

(a-2) Unsaturated Higher Fatty Acid

As the unsaturated higher fatty acid, an unsaturated fatty acid having 6 to 22 carbon atoms is preferably used. Of these, more preferred are, for example, undecylenic acid, oleic acid, elaidic acid, cetoleic acid, erucic acid, brassidic acid, sorbic acid, linoleic acid, linolenic acid, arachidonic acid, stearolic acid, 2-hexadecenoic acid, 7-hexadecenoic acid, 9-hexadecenoic acid, gadoleic acid, gadoelaidic acid, 11-eicosenoic acid and a mixture thereof.

(b) Higher Fatty Acid Metal Salt

As the higher fatty acid metal salt, a saturated higher fatty acid metal salt, a unsaturated higher fatty acid metal salt or a mixture thereof is preferably used.

(b-1) Saturated Higher Fatty Acid Metal Salt

The saturated higher fatty acid metal salt is represented by the following formula,

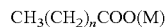

$CH_3(CH_2)_nCOO(M)$ wherein n is an integer of from 8 to 30, and M is a metal element. Preferred metal elements are those belonging to 1A, 2A and 3A Groups of the periodic table, zinc or aluminum, etc.

(b-2) Unsaturated Higher Fatty Acid Metal Salt

As the unsaturated higher fatty acid metal salt, preferably used a metal salt between an unsaturated fatty acid having 6 to 22 carbon atoms and an element belonging to 1A, 2A or 3A of the periodic table, zinc or aluminum, etc. Particularly, more preferred is a lithium salt of undecylenic acid, oleic acid, elaidic acid, cetoleic acid, erucic acid, brassidic acid, sorbic acid, linoleic acid, linolenic acid, arachidonic acid, stearolic acid, 2-hexadecenoic acid, 7-hexadecenoic acid, 9-hexadecenoic acid, gadoleic acid, gadoelaidic acid or 11-eicosenoic acid, or a sodium, magnesium, calcium, zinc or aluminum salt of the same, or a mixture thereof.

(c) Higher Fatty Acid Ester

As the higher fatty acid ester in the present invention, an ester between a higher alcohol a higher fatty acid, an ester between a polyhydric alcohol and a higher fatty acid or a mixture thereof is preferably used.

(c-1) Ester Between Higher Alcohol and Higher Fatty Acid

As the ester between a higher alcohol and a higher fatty acid, preferred are esters between a higher alcohol having not less than 8 carbon atoms and a higher fatty acid having not less than 8 carbon atoms. Examples of preferred higher fatty acid esters are lauryl laurate, lauryl myristate, lauryl palmitate, lauryl stearate, lauryl behenate, lauryl lignocerate, lauryl melissate, myristyl laurate, myristyl myristate, myristyl stearate, myristyl behenate, myristyl lignocerate, myristyl melissate, palmityl laurate, palmityl myristate, palmityl stearate, palmityl behenate, palmityl lignocerate, palmityl melissate, stearyl laurate, stearyl myristate, stearyl palmitate, stearyl stearate, stearyl behenate, stearyl arachinate, stearyl lignocerate, stearyl melissate, icosyl laurate, icosyl palmitate, icosyl stearate, icosyl behenate, icosyl lignocerate, icosyl melissate, behenyl laurate, behenyl myristate, behenyl palmitate, behenyl stearate, behenyl behenate, behenyl arachinate, behenyl melissate, tetracosanyl laurate, tetracosanyl palmitate, tetracosanyl stearate, tetracosanyl behenate, tetracosanyl lignocerate, tetracosanyl cerotate, cerotinyl stearate, cerotinyl behenate, cerotinyl cerotate, melissyl laurate, melissyl stearate, melissyl behenate, melissyl melissate and a mixture thereof.

(c-2) Ester Between Polyhydric Alcohol and Higher Fatty Acid

Examples of the polyhydric alcohol preferably used for the ester between a polyhydric alcohol and a higher fatty acid are glycerol, 1,2,3-butanetriol, 1,2,3-pentanetriol, erythritol, pentaerythritol, trimethylolpropane, mannitol and sorbitol. Examples of the higher fatty acid preferably used therefor are capric acid, uradecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid.

The above-mentioned ester between the polyhydric alcohol and the higher fatty acid may be any of mono-esters, di-esters and tri-esters. More preferred examples thereof are higher fatty acid mono-glycerides such as glycerol mono-laurate, glycerol mono-myristate, glycerol mono-stearate, glycerol mono-behenate, glycerol mono-lignocerate and glycerol mono-melissate; pentaerythritol higher fatty acid mono- or di-esters such as pentaerythritol mono- or di-laurate, pentaerythritol mono- or di-myristate, pentaerythritol mono- or di-palmitate, pentaerythritol mono- or di-stearate, pentaerythritol mono- or di-behenate, pentaerythritol mono- or di-lignocerate and pentaerythritol mono- or di-melissate; trimethylolpropane higher fatty acid mono- or di-esters such as trimethylolpropane mono- or di-laurate, trimethylolpropane mono- or di-myristate, trimethylolpropane mono- or di-palmitate, trimethylolpropane mono- or di-stearate, trimethylolpropane mono- or di-behenate, trimethylolpropane mono- or di-lignocerate and trimethylolpropane mono- or di-melissate; sorbitan higher fatty acid mono-, di- or tri- esters such as sorbitan mono-, di- or tri-laurate, sorbitan mono-, di- or tri-myristate, sorbitan mono-, di- or tri-stearate, sorbitan mono-, di- or tri-behenate, sorbitan mono-, di- or tri-lignocerate and sorbitan mono-, di- or tri-melissate; mannitol higher fatty acid mono-,di- or tri-esters such as mannitol mono-, di- or tri-laurate, mannitol mono-, di- or tri-myristate, mannitol mono-, di- or tri-palmitate, mannitol mono-, di- or tri-stearate, mannitol mono-, di- or tri-behenate, mannitol mono-, di- or tri-lignocerate and mannitol mono-, di- or tri-melissate, and a mixture thereof.

These mold lubricants such as (a) the higher fatty acid, (b) the higher fatty acid metal salt or (c) the higher fatty acid ester are used in an amount of preferably from 0.001 to 5 parts by weight based on 100 parts by weight of PTT in the resin composition of the present invention. More preferred is from 0.01 to 3 parts by weight. It is not preferred that the mold lubricant is used in an amount of less than 0.001 part by weight, because there is a tendency that no improvement of mold releasing properties appears. Further, it is not preferred that the moldability-improving agent is used in an amount exceeding 5 parts by weight, because there is a tendency that a silvery material appears on the surface of the molded product and the mechanical properties of the molded product deteriorate.

Further, an additive usually used such as flame retarders, ultraviolet absorbers, heat stabilizers, antioxidants, plasticizers, coloring agents and impact strength-improving agents may be incorporated in the resin composition in accordance with the present invention as far as the objects of the present invention are not impaired.

Still further, a thermoplastic resin may be incorporated in the resin composition in accordance with the present invention as far as the objects of the present invention are not impaired. Examples of the thermplastic resin are polycarbonate, polyethylene terephthalate, polybutylene terephthalate and polystyrene resins such as rubber-reinforced polystyrene and acrylonitrile-butadiene-styrene resins.

As mentioned above, how to obtain the reinforced polytrimethylene terephthalate resin composition in accordance with the present invention is not particularly limited. For example, a mixture of the polytrimethylene terephthalate, the inorganic filler and the above-mentioned additive added when necessary is melt-kneaded at a temperature of from 200 to 400° C. using a conventional melt-kneading machine such as a single or multi screw extruder, a kneader, a mixing roll and Banbury mixer. Particularly, it is preferred to carry out the melt kneading using an extruder for convenience.

The reinforced polytrimethylene terephthalate resin composition in accordance with the present invention can be molded into various molded products according to a conventional molding method such as injection molding, extrusion molding, compression molding and blow molding. The molded product obtained from the resin composition in accordance with the present invention is preferably an injection-molded product. Incidentally, when the resin composition in accordance with the present invention is used, it is possible to obtain any shape of the molded product by varying a shape of the mold. It is particularly recommended that the molded product obtained from the resin composition in accordance with the present invention is used for car parts or the like, for which superior fatigue properties are required. Further, the molded products obtained from the resin composition in accordance with the present invention can be integrated with one another through welding such as vibration welding and ultrasonic welding, and the integrated product can be utilized as parts for various uses.

EXAMPLE

The present invention is further explained with reference to Examples and Comparative Examples, which are not intended to limit the scope of the present invention. Analytical methods of the resin composition and methods for measuring physical properties of the molded product are as follows.

(1) Amount of Grafting Polytrimethylene Terephthalate Layer Provided on Surface of Inorganic Filler (Grafting Amount)

To 100 ml of HFIP (hexafluoroisopropanol) solvent was added 5 g of the reinforced polytrimethylene terephthalate resin composition, thereby dissolving polytrimethylene terephthalate, and the resulting solution was separated by means of centrifugal separation (25,000 rpm, 30 min). To a centrifugal tube was fed 25 ml of HFIP, ultrasonic washing was continued for 30 minutes. In such a manner, the solution was separated by means of centrifugal separation. Such a manner was repeated 5 times. Thereafter, the residue was dried at 80° C. for 10 hours. The resulting inorganic filler was placed in a platinum crucible, weighed, then baked at 650° C. for 1 hour, and thereafter again weighed. The weights of the inorganic filler before and after baking were taken as W0 and W1, respectively. The amount of the grafting polytrimethylene terephthalate layer provided on the surface of the inorganic filler (grafting amount) was calculated by the following equation in terms of a grafting amount (parts by weight) per 100 parts by weight of the inorganic filler.

Grafting amount per 100 parts by weight of the inorganic filler (parts by weight)=[(W0−W1)/W1]×100

(2) Melt Viscosity

To 1000 ml of HFIP (hexafluoroisopropanol) solvent was added 100 g of the reinforced polytrimethylene terephthalate resin composition, thereby dissolving polytrimethylene terephthalate. The resulting mixture was stirred at 40° C. for 2 hours to complete dissolution, thereafter allowed to stand, after sufficient precipitation of the inorganic filler, the supernatant was recovered. Thereafter, 500 ml of chloroform was added to the recovered supernatant to dilute it. Further, acetonitrile was added thereto to precipitate the resin component, which was then separated by filtration with a glass filter and dried. The drying was carried out in a manner of air drying for 3 hours, vacuum-drying at 80° C. for 10 hours and vacuum-drying at 120° C. for 5 hours in this order. The thus obtained resin component was melted at 260° C. and formed into a sample sheet having a thickness of 1.7 mm. Using the sample, melt viscosity thereof was measured. As a measuring machine, RMS-800, manufactured by Reometrix Co. was used. The above-mentioned sheet was left melted at 260° C. for 10 minutes in the measuring machine, and thereafter the melt viscosity was measured at a shear rate of 1 rad/s.

(3) Fatigue Properties

Using an injection-molding machine (PS40E, manufactured by Nissei plastic industrial Co.), a specimen was prepared. More specifically, at a cylinder temperature of 260° C. and a mold temperature of 95° C., the reinforced polytrimethylene terephthalate resin composition was molded to obtain a tensile impact dumbbell (Type S) according to ASTM-D1822.

The fatigue properties of the specimen were examined by measuring a repetitive fatigue number under a specific stress with use of a vibration fatigue test machine (VFA-IKVA, manufactured by Orientec Co.). The measurement was carried out under conditions of tensile load controlled, distance between chucks: 20 mm, ambient temperature: 23° C., frequency: 10 Hz, stress mode: tension-tension and minimum stress: 5.4 MPa.

(4) Static Tensile Strength

Using an injection-molding machine (PS40E, manufactured by Nissei plastic industrial Co.), a specimen was prepared. More specifically, at a cylinder temperature of 260° C. and a mold temperature of 95° C., the reinforced polytrimethylene terephthalate resin composition was molded to obtain a specimen according to ASTM-D638 Type I.

The static tensile strength of the specimen was measured according to ASTM-D638. Incidentally, the measurement was carried out under conditions of temperature: 23° C. and cross head speed: 5 mm/min using a tensile test machine (UTM25, manufactured by Toyo Seiki Co.).

(5) Molding Appearance

Using an injection-molding machine, a flat board having a size of 100×400×3 mm was obtained at a cylinder temperature of 260° C. and a mold temperature of 95° C. A flow terminal portion of the obtained flat board was observed to examine the molding appearance. The gloss (60°) of the flow terminal portion of not less than 60 was marked with ○. That of less than 60 was marked with X.

Example 1

A bisphenol-A type epoxy emulsion, an urethane emulsion, γ-aminopropyltriethoxysilane and deionized water were mixed in a weight ratio of 4:2:1:93 to obtain a mixture solution. The mixture solution was applied to glass fiber having a diameter of 13 µm emitted in a filament form after melt spinning with use of an applicator mounted on the way through winding of the glass fiber on a rotating drum. Thereafter, the resultant was dried, thereby obtaining a glass fiber bundle, whose surface had been treated with the above-mentioned mixture. At this time, an amount of the mixture applied was found to be 0.7% by weight. The surface-treated glass fiber bundle was cut into a length of 3 mm, thereby obtaining a chopped strand of glass fiber.

70 parts by weight of a polytrimethylene terephthalate (CP-509201, manufactured by Shell Chemical Co.) and 30 parts by weight of the above chopped strand of glass fiber were melt-kneaded at a resin temperature of 275° C. with use of a twin screw extruder (TEM58, manufactured by Toshiba Machine Co.). Thus, a reinforced polytrimethylene terephthalate resin composition having a glass fiber concentration of 30% by weight was obtained in a pellet form. Using the obtained pellet, analysis of the resin composition and examination of physical properties of the molded product were carried out according to the methods mentioned already. The results are shown in Table 1.

Example 1 was repeated, except that a phenol novolak type epoxy emulsion was used in place of the bisphenol-A type epoxy emulsion, thereby obtaining a reinforced polytrimethylene terephthalate resin composition in a pellet form. The resin composition was analyzed and physical properties of the molded product were examined. The results are shown in Table 1.

Example 3

Example 1 was repeated, except that a mixture solution composed of a bisphenol-A type epoxy emulsion, diglycidyl phthalate emulsion, an urethane emulsion, γ-aminopropyltriethoxysilane and deionized water in a weight ratio of 4:3:2:1:90 was used for the surface-treatment of glass fiber, thereby obtaining a reinforced polytrimethylene terephthalate resin composition in a pellet form. The resin composition was analyzed and physical properties of the molded product were examined. The results are shown in Table 1.

Example 4

Example 1 was repeated, except that a mixture solution composed of a bisphenol-A type epoxy emulsion, glycidyl acrylate emulsion, an urethane emulsion, γ-aminopropyltriethoxysilane and deionized water in a weight ratio of 4:3:2:1:90 was used for the surface-treatment of glass fiber, thereby obtaining a reinforced polytrimethylene terephthalate resin composition in a pellet form. The resin composition was analyzed and physical properties of the molded product were examined. The results are shown in Table 1.

Example 5

A copolymer of maleic anhydride and butadiene (molar ratio=1:1) was added to an ammonia aqueous solution (concentration 0.5%), followed by thorough stirring, and the resulting liquor was mixed with γ-aminopropyltriethoxysilane, thereby obtaining a mixture solution. The above silane compound was used in an amount of 0.6 part by weight based on 2 parts by weight of the above-mentioned copolymer. Using the thus obtained mixture solution for the surface-treatment of glass fiber, Example 1 was repeated, thereby obtaining a reinforced polytrimethylene terephthalate resin composition in a pellet form. The resin composition was analyzed and physical properties of the molded product were examined. The results are shown in Table 1.

Example 6

Example 1 was repeated, except that glass fiber having a fibrous diameter of 10 µm was used, thereby obtaining a reinforced polytrimethylene terephthalate resin composition in a pellet form. The resin composition was analyzed and physical properties of the molded product were examined. The results are shown in Table 1.

Example 7

50 Parts by weight of a polytrimethylene terephthalate (CP-509201, manufactured by Shell Chemical Co.), 30 parts by weight of the chopped strand of glass fiber obtained in the same manner as in Example 1, and 20 parts by weight of wollastonite (VM-8N, manufactured by Hayashi Kasei Co.) were melt-kneaded at a resin temperature of 275° C. with use of a twin screw extruder (TEM58, manufactured by Toshiba Machine Co.). Thus, a reinforced polytrimethylene terephthalate resin composition having an inorganic filler concentration of 50% by weight was obtained in a pellet form. Using the obtained pellet, analysis of the resin composition and examination of physical properties of the molded product were carried out according to the methods mentioned already. The results are shown in Table 1.

Comparative Example 1

Example 1 was repeated, except that a mixture solution composed of γ-aminopropyltriethoxysilane and deionized water in a weight ratio of 1:99 was used for the surface-treatment of glass fiber, thereby obtaining a reinforced polytrimethylene terephthalate resin composition in a pellet form. The resin composition was analyzed and physical properties of the molded product were examined. The results are shown in Table 1.

Comparative Example 2

Example 1 was repeated, except that glass fiber freed from the surface-treatment with any mixture was used, thereby obtaining a reinforced polytrimethylene terephthalate resin composition in a pellet form. The resin composition was analyzed and physical properties of the molded product were examined. The results are shown in Table 1.

Comparative Example 3

69.5 Parts by weight of a polytrimethylene terephthalate (CP-509201, manufactured by Shell Chemical Co.), 30 parts by weight of the glass fiber surface-treated with the same mixture solution as in Comparative Example 1, and 0.5 part by weight of a bisphenol-A type epoxy resin (AER 6084, manufactured by Asahi Kasei Epoxy Co.) were melt-kneaded at a resin temperature of 275° C. with use of a twin screw extruder (TEM58, manufactured by Toshiba Machine Co.). Thus, a reinforced polytrimethylene terephthalate resin composition having a glass fiber concentration of 30% by weight was obtained in a pellet form. Using the obtained pellet, analysis of the, resin composition and examination of physical properties of the molded product were carried out according to the methods mentioned already. The results are shown in Table 1.

Comparative Example 4

Example 3 was repeated, except that a polybutylene terephthalate (2002) manufactured by Polyplastics Co. was used in place of the polytrimethylene terephthalate used in Example 3, thereby obtaining a reinforced polybutylene terephthalate resin composition in a pellet form. The resin composition was analyzed and physical properties of the molded product were examined. The results are shown in Table 1.

TABLE 1

|  | Unit | Example 1 | Example 2 | Example 3 | Example 4 | Example 5 | Example 6 | Example 7 |
|---|---|---|---|---|---|---|---|---|
| Kind of polymer |  | PTT | PTT | PTT | PTT | PTT | PTT | PTT |
| Glass fiber | % by wt | 30 | 30 | 30 | 30 | 30 | 30 | 30 |
| Diameter of glass fiber | μm | 13 | 13 | 13 | 13 | 13 | 10 | 13 |
| Wollastonite | % by wt | 0 | 0 | 0 | 0 | 0 | 0 | 20 |
| Grafting amount [(W0 − W1)/W0] × 100 | Parts by wt. | 0.20 | 0.23 | 0.24 | 0.24 | 0.17 | 0.22 | 0.18 |
| Melt viscosity(1 rad/s) | Pa · s | 233 | 257 | 240 | 244 | 220 | 238 | 229 |
| Repetitive fatigue number <23° C., 10 Hz> |  |  |  |  |  |  |  |  |
| Maximum stress 80 MPa | Number | 6500 | 7800 | 7900 | 7500 | 4300 | 8800 | 7700 |
| Maximum stress 60 MPa | Number | 1200000 | 2100000 | 2300000 | 1900000 | 770000 | 2700000 | 1500000 |
| Tensile strength | MPa | 156 | 162 | 165 | 165 | 151 | 163 | 180 |
| Appearance of flow terminal portion |  | ○ | ○ | ○ | ○ | ○ | ○ | ○ |

|  | Comparative Example 1 | Comparative Example 2 | Comparative Example 3 | Comparative Example 4 |
|---|---|---|---|---|
| Kind of polymer | PTT | PTT | PTT | PBT |
| Glass fiber | 30 | 30 | 30 | 30 |
| Diameter of glass fiber | 13 | 13 | 13 | 13 |
| Wollastonite | 0 | 0 | 0 | 0 |
| Grafting amount [(W0 − W1)/W0] × 100 | 0.08 | 0.03 | 0.12 | 0.17 |
| Melt viscosity(1 rad/s) | 241 | 235 | 1730 | 274 |

TABLE 1-continued

| Repetitive fatigue number <23° C., 10 Hz> | | | | |
|---|---|---|---|---|
| Maximum stress 80 MPa | 370 | 21 | 2200 | 1800 |
| Maximum stress 60 MPa | 14000 | 520 | 210000 | 12000 |
| Tensile strength | 138 | 126 | 153 | 129 |
| Appearance of flow terminal portion | ○ | ○ | X | X |

Example 8

Example 1 was repeated, except that the glass fiber concentration in the reinforced polytrimethylene terephthalate resin composition was changed to 15% by weight, thereby obtaining a reinforced polytrimethylene terephthalate resin composition in a pellet form. The resin composition was analyzed and physical properties of the molded product were examined. The results are shown in Table 2.

Comparative Example 5

Comparative Example 1 was repeated, except that the glass fiber concentration in the reinforced polytrimethylene terephthalate resin composition was changed to 15% by weight, thereby obtaining a reinforced polytrimethylene terephthalate resin composition in a pellet form. The resin composition was analyzed and physical properties of the molded product were examined. The results are shown in Table 2.

Example 9

Example 1 was repeated, except that the glass fiber concentration in the reinforced polytrimethylene terephthalate resin composition was changed to 50% by weight, thereby obtaining a reinforced polytrimethylene terephthalate resin composition in a pellet form. The resin composition was analyzed and physical properties of the molded product were examined. The results are shown in Table 3.

Comparative Example 6

Comparative Example 1 was repeated, except that the glass fiber concentration in the reinforced polytrimethylene terephthalate resin composition was changed to 50% by weight, thereby obtaining a reinforced polytrimethylene terephthalate resin composition in a pellet form. The resin composition was analyzed and physical properties of the molded product were examined. The results are shown in Table 3.

TABLE 2

| | Unit | Example 8 | Comparative Example 5 |
|---|---|---|---|
| Kind of polymer | | PTT | PTT |
| Glass fiber | % by wt | 15 | 15 |
| Diameter of glass fiber | μm | 13 | 13 |
| Grafting amount [(W0 − W1)/W0] × 100 | Parts by wt. | 0.21 | 0.07 |
| Melt viscosity(1 rad/s) | Pa · s | 230 | 234 |
| Repetitive fatigue number <23° C., 10 Hz> | | | |
| Maximum stress 60 MPa | Number | 9100 | 310 |
| Maximum stress 40 MPa | Number | 1700000 | 22000 |
| Tensile strength | MPa | 107 | 96 |
| Appearance of flow terminal portion | | ○ | ○ |

TABLE 3

| | Unit | Example 9 | Comparative Example 6 |
|---|---|---|---|
| Kind of polymer | | PTT | PTT |
| Glass fiber | % by wt | 50 | 50 |
| Diameter of glass fiber | μm | 13 | 13 |
| Grafting amount [(W0 − W1)/W0] × 100 | Parts by wt. | 0.18 | 0.06 |
| Melt viscosity(1 rad/s) | Pa · s | 229 | 234 |
| Repetitive fatigue number <23° C., 10 Hz> | | | |
| Maximum stress 60 MPa | Number | 5200 | 190 |
| Maximum stress 40 MPa | Number | 1400000 | 38000 |
| Tensile strength | MPa | 180 | 166 |
| Appearance of flow terminal portion | | ○ | ○ |

INDUSTRIAL APPLICABILITY

The reinforced polytrimethylene terephthalate resin composition in accordance with the present invention is of good molding appearance, and is remarkably superior in mechanical properties, particularly fatigue properties. Car parts and various structural members formed from such a resin composition are far superior in durability, so that high reliability of the parts continues for a long period of time.

The invention claimed is:

1. A reinforced polytrimethylene terephthalate resin composition comprising a polytrimethylene terephthalate and an inorganic filler, wherein the inorganic filler has a concentration within the range from 5 to 70% by weight based on a total weight of the resin composition, wherein a surface of the inorganic filler is grafted with a polytrimethylene terephthalate layer having a concentration in the range from 0.1 to 2 parts by weight based on 100 parts by weight of the inorganic filler, wherein an intrinsic viscosity of the polytrimethylene terephthalate present in the resin composition is 0.7 dl/g or more, and wherein a melt viscosity measured at a resin temperature of 260° C. and a shear rate of 1 rad/sec of a resin component present in the resin composition is not more than 600 Pa·s, wherein the resin component is a remaining portion after eliminating the inorganic filler from the resin composition, and wherein the inorganic filler is glass fiber and optionally at least one inorganic filler other than glass fiber.

2. The reinforced polytrimethylene terephthalate resin composition according to claim 1, wherein the surface of the inorganic filler is grafted with a polytrimethylene terephthalate layer having a concentration in the range from 0.12 to 2 parts by weight based on 100 parts by weight of the inorganic filler.

3. The reinforced polytrimethylene terephthalate resin composition according to claim 1, wherein a surface of the inorganic filler is grafted with a polytrimethylene terephthalate layer having a concentration in the range from 0.18 to 2 parts by weight based on 100 parts by weight of the inorganic filler.

4. The reinforced polytrimethylene terephthalate resin composition according to claim 1, 2 or 3, wherein the inorganic filler comprises glass fiber and wollastonite.

5. The reinforced polytrimethylene terephthalate resin composition according to claim 1, wherein the inorganic filler is glass fiber.

6. The reinforced polytrimethylene terephthalate resin composition according to claim 1, 2 or 3, wherein the inorganic filler is a combination of glass fiber and an inorganic filler other than glass fiber.

7. The reinforced polytrimethylene terephthalate resin composition according to claim 6, wherein the inorganic filler other than glass fiber is wollastonite.

8. A molded product formed from the reinforced polytrimethylene terephthalate resin composition according to any one of claims 1, 2 and 3.

9. The molded product according to claim 8, which is an injection-molded product.

10. A car part formed from the reinforced polytrimethylene terephthalate resin composition according to any one of claims 1, 2 and 3.

* * * * *